(No Model.)  4 Sheets—Sheet 1.

C. R. SMITH.
PHOTOGRAPHIC CAMERA.

No. 418,764.  Patented Jan. 7, 1890.

WITNESSES:  
INVENTOR  
Calvin R. Smith  
BY Arden S. Fitch  
his ATTORNEY (No Model.) 4 Sheets—Sheet 3.

C. R. SMITH.
PHOTOGRAPHIC CAMERA.

No. 418,764. Patented Jan. 7, 1890.

WITNESSES:

INVENTOR
Calvin R. Smith
BY
Arden S. Fitch
His ATTORNEY

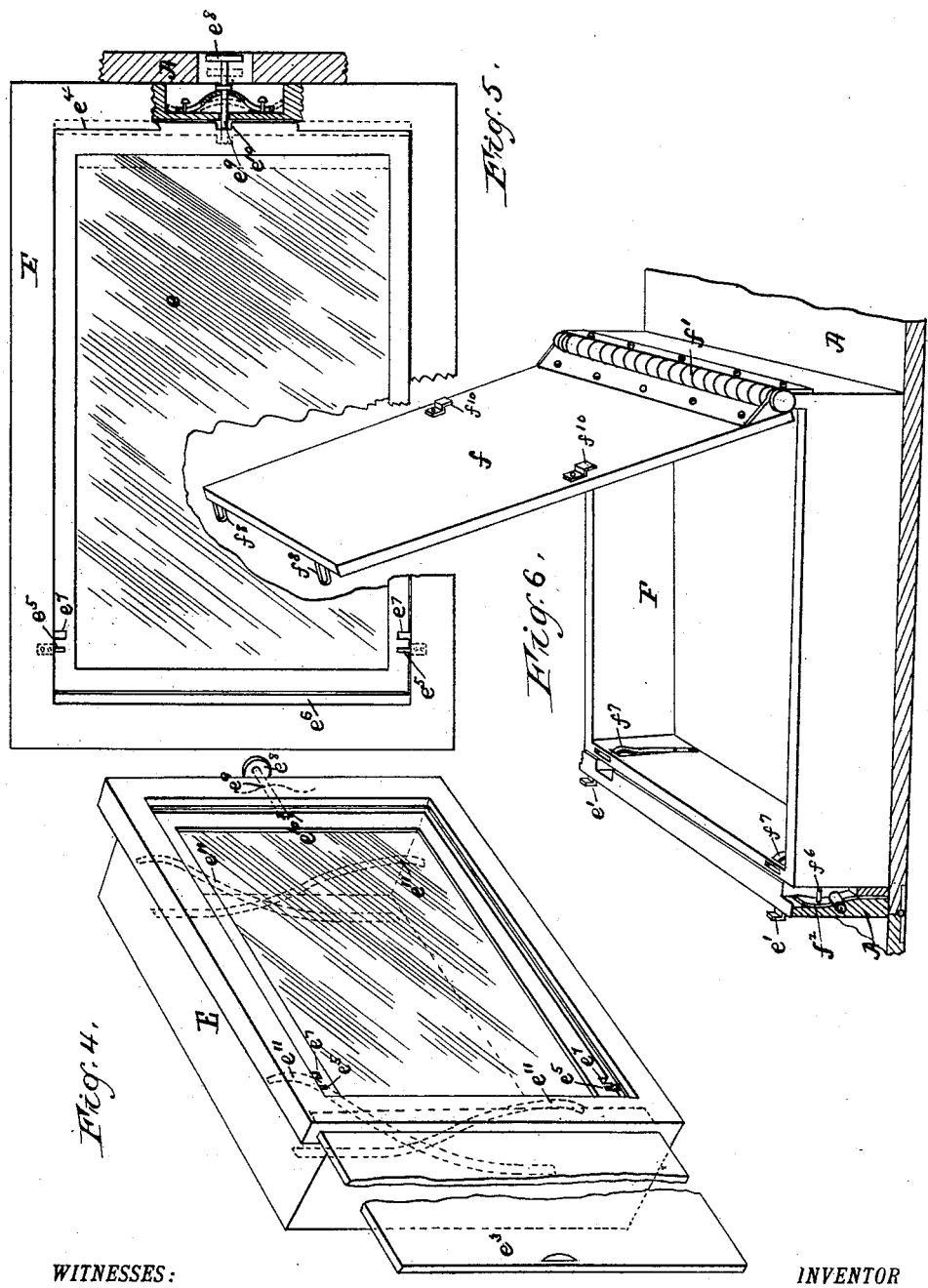

UNITED STATES PATENT OFFICE.

CALVIN RAE SMITH, OF NEW YORK, N. Y.

PHOTOGRAPHIC CAMERA.

SPECIFICATION forming part of Letters Patent No. 418,764, dated January 7, 1890.

Application filed February 23, 1889. Serial No. 300,888. (No model.)

*To all whom it may concern:*

Be it known that I, CALVIN RAE SMITH, of the city, county, and State of New York, a citizen of the United States, have invented certain new and useful Improvements in Photographic Cameras, of which the following is a full, clear, and exact description, reference being had to the accompanying drawings, forming part of this specification.

My invention relates to cameras for use in taking instantaneous photographs, and which are at the same time capable of taking photographs by a time-exposure; and my invention consists in the devices hereinafter described, and more particularly recited in the claims.

Figure 1:
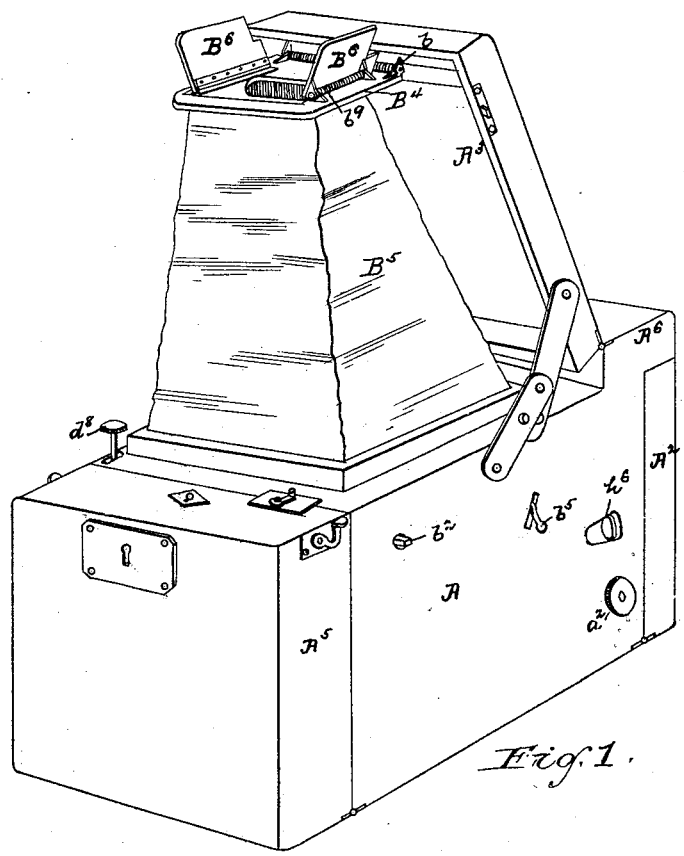
Figure 2:
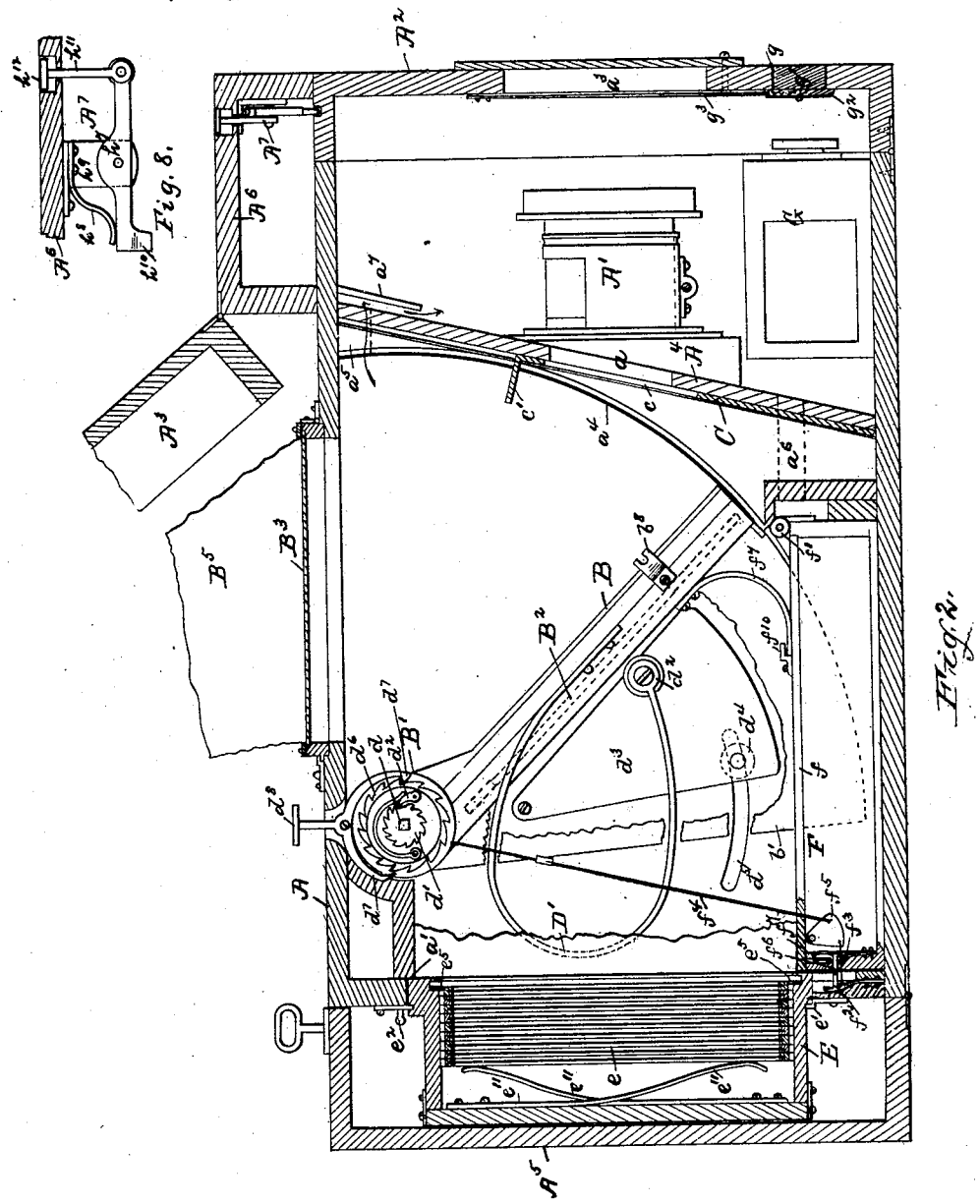
Figure 3:
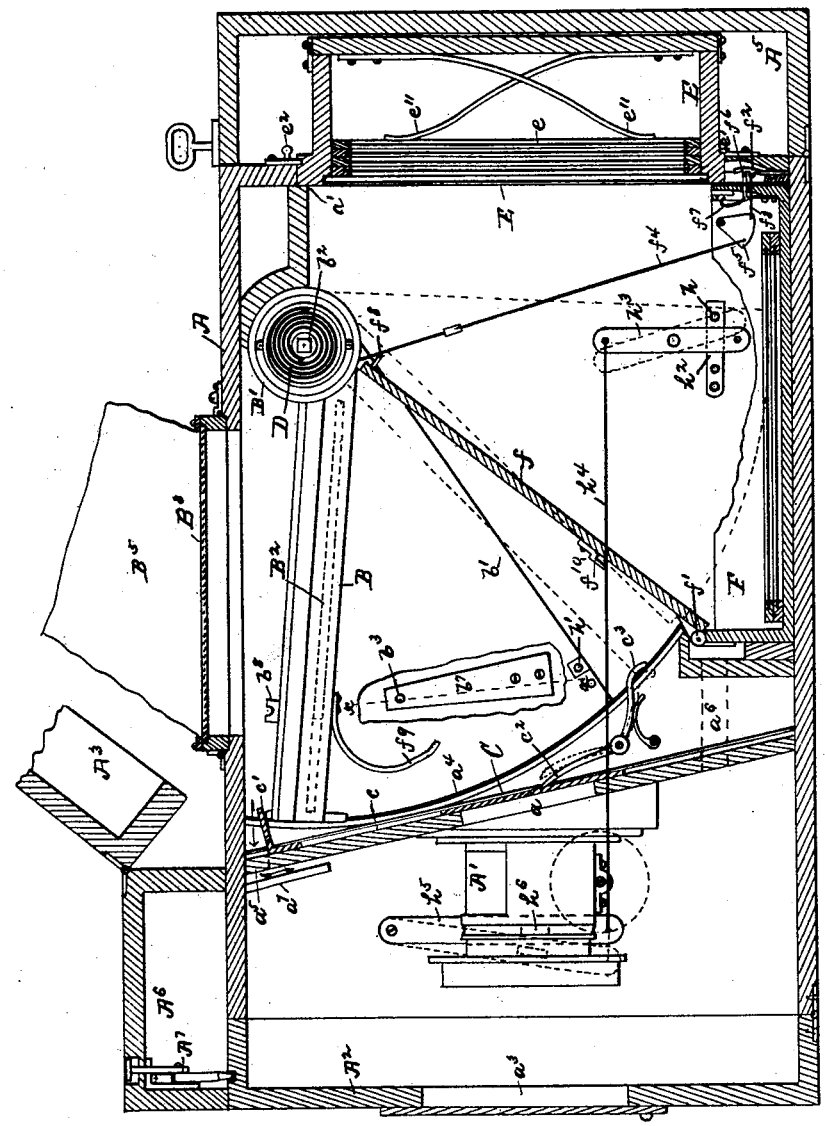
Figure 7:
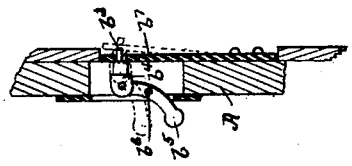

Figure 1 is a rearward elevation, in perspective, of a camera containing my invention. Fig. 2 is a vertical central longitudinal section of the camera-box, showing the internal parts and mechanism partly in full lines and looking in the direction toward the left-hand side of the interior. Fig. 3 is a similar view of the same, looking toward the right-hand side of the interior. Fig. 4 is a perspective front elevation of my detachable sensitive-plate magazine. Fig. 5 is a front elevation of the same. Fig. 6 is a plan in perspective of my removable negative-box, hereinafter described. Fig. 7 is a longitudinal section, in detail, on line $x$ $x$ in Fig. 2, of a motion-limiting stop I employ to arrest the movement of the shutters in making a time-exposure; and Fig. 8 is a side elevation in detail of a catch device shown in position in end elevation in Figs. 2 and 3, which I employ to hold closed the hinged end piece on the front of the camera-box.

My present invention involves improvements upon the structure and general mechanism of, as well as the addition of specific devices to, the photographic camera for which Letters Patent No. 301,400 were granted to me July 1, 1884.

A is the camera-box, in the opposite front and rear ends of which are respectively the lens-opening $a$ and the sensitive-plate opening $a'$. The customary lens-holder $A'$ is fitted to the opening $a$, the lens or its holder being adjustable in the usual manner by well-known devices operated by a finger-wheel $a^2$ on the outside of the box, as shown in Fig. 1. The box is usually and preferably constructed with the chamber constituted on its forward end inclosing the lens-holder, as shown, and with the front end wall $A^2$ of said chamber hinged to the box, as shown, so that access may be had to said chamber. An aperture $a^3$ in said hinged wall registers with the lens-holder and has a closing lid or cover, as shown.

B is the swinging shutter carried by a shaft $B'$, having bearings in the box-walls and adapted to intervene within the box between the lens and plate openings, and by being swung on its shaft to be removed from between said openings, so that communication is established between them in making an exposure. $B^2$ is a mirror carried by said shutter and adapted, when the shutter is between said openings $a$ and $a'$, to reflect the image focused in the lens upon the ground-glass plate $B^3$, arranged in an aperture in the box wall, preferably at the top of the box, as shown, so that said image is seen through said plate.

$B^4$ is the eye-piece above the plate $B^3$, and connected thereto by a collapsible hood $B^5$, and said eye-piece is hinged, preferably by a spring-hinge $b$, to a lid $A^3$, which in turn is hinged to the box, so that when the camera is not in use the hood and eye-piece may be folded under said lid, and said lid will inclose and conceal them when it is shut down upon the box over the plate $B^3$.

Upon either side of the lens-opening $a$ within the box, and extending along and following the course of the shutter B in its swing upon its shaft, are the curved flanges or plates $a^4$, against which the shutter-edge plays closely, so that the passage of light between the flanges and shutter is prevented. The shutter B is also provided with the end pieces or wings $b'$, which fit closely to the box sides, preventing the passage of light between them and the box sides, respectively.

The parts above described are substantially shown and included in the Letters Patent heretofore granted to me, as aforesaid.

A feature of my present invention consists in the combination, with the swinging shutter B, of an independent auxiliary sliding shutter C. The said shutter C is separate from the shutter B, and has play in ways in the wall or partition $A^4$, in which is the lens-opening, and it has an aperture $c$, adapted to register with said lens-opening. The wall or partition $A^4$ is preferably inclined from the top downward rearwardly of the box, as shown. The shutter C is provided with a projection $c'$, adapted to engage the shutter B when the latter has swung past the opening $a$ in its movement in establishing communication between said opening and the plate-opening $a'$, so that the further movement of the shutter B in the same direction will slide the shutter C in its ways, thus causing said shutter C to close the aperture $a$. These movements of the shutters are clearly illustrated in Figs. 2 and 3, the shutters being arranged to have a vertical movement in the box.

In Fig. 2 both shutters are at the limit of their respective downward movements, and the aperture $c$ in the sliding shutter C registers with the lens-opening $a$. When the shutter B is swung upward, just as it has passed the lens-opening and so established communication between said opening and the sensitive plate in the opening $a'$, it engages the sliding shutter C, and its further upward movement to the limit thereof carries the sliding shutter upward, closing the opening $a$, the shutters coming to rest in the positions shown in Fig. 3. By this means an instantaneous exposure is effected. When the sliding shutter C is thus closed upon the lens-opening $a$, it engages a detaining or holding catch $c^2$, as shown in Fig. 3, which prevents it from sliding downward when released by the shutter B. By reversely rotating the shaft $B'$, which may be accomplished by a suitable key applied to a square arbor $b^2$ on the shaft end and projecting through the box-wall, as seen in Fig. 1, the shutter B may be swung downward again, and when it has in such movement passed the lens-opening $a$, so as to itself cut off communication between said opening and the plate, it trips the catch $c^2$ desirably by engaging a heel $c^3$ thereof, as shown, whereby the shutter C is released and will fall by gravity and so open the lens-aperture $a$. The lens-aperture $a$ is thus maintained closed during the reversed movement of the shutter B after an exposure, the advantage whereof is obvious.

When it is desired to make a time-exposure, the stop-pin $b^3$ is adjusted to project inwardly of the box, so that it is engaged by the shutter B when said shutter has passed the opening $a$, thus stopping the shutter before it has moved the shutter C. The exposure is terminated by releasing the shutter B by withdrawing the stop-pin $b^3$, thus allowing said shutter by its further upward movement to draw the shutter C across the aperture $a$.

I find the following devices effective in operating the stop-pin $b^3$. A short arm $b^4$ carries said pin, and said arm is pivoted to a lever $b^5$, which extends to the outside of the box through a slot in the box-wall, the lever having a transverse fulcrum-pin $b^6$ working upon the inner face of said slot, and the lever-arm and pin $b^3$ playing in a recess in the box-wall, as shown in Fig. 7. By swinging the lever $b^5$ on its fulcrum-pin into the position indicated in broken lines in said Fig. 7 the pin $b^3$ is projected into the interior of the box, and by reversely swinging the lever the arm and its pin are retracted and held within the wall-recess by a spring $b^7$, as shown. A suitably-notched plate $b^8$ may be provided on the shutter B to engage the pin $b^3$.

I provide apertures $a^5$ and $a^6$ in the wall $A^4$ beyond the upward and downward limits of movement of the shutter B in the box, so that the air within the box may circulate freely therein when said shutter moves, as otherwise the tendency of the movement of the shutter within the closed box would be to compress the air in front of the shutter and to create a suction back of it, thereby retarding or interfering with the desired movement of the shutter B in effecting an instantaneous exposure. The aperture $a^5$ is guarded by a light-excluding lip or flange $a^7$, as shown.

A further feature of my invention is the devices I employ to actuate the shutter B. Upon the shaft $B'$ is arranged a spring D, adapted to be wound or coiled by means of an arbor $d$, projecting through the box-wall, and to be held in tension by the ratchet $d'$ and spring-pawl $d^2$. The tendency of this spring D is to force the shutter upward.

D′ is a leaf-spring, one end of which is attached to the rearward side of the shutter and the opposite end of which is pivotally attached, as at $d^2$, to a plate $d^3$, which is pivoted to the box-wall in a closed recess therein. The tendency of this spring D′ is similar to that of the shaft-spring D. The spring D′ is preferably made with or given a greater tension than that exerted by the spring D, so that said spring D becomes simply an auxiliary spring in the service of the two in throwing the shutter B. The tension of the spring D′ is adjustable by means of a set-screw $d^4$ in the plate $d^3$, which reaches from said closed recess through a suitable slot $d^5$ in the box-wall to the exterior of the box, so that the plate $d^3$ may, from the exterior of the box, be swung on its pivot within the said recess and then secured in position in the desired place to give the intended tension to the spring D′. The tension of the coil-spring D on the shaft $B'$ may be adjusted by means of an escapement consisting of an escape-wheel $d^6$ on the spring-barrel and pallets $d^7$, operated by a stem $d^8$, projecting through the top of the camera-box. By means of the motor-spring D′ and the auxiliary spring D, both being adjustable in tension, substantially as described, the speed or rate of the movement of the shutters in making an instantaneous exposure may be graduated or adjusted and varied to suit the desires of the operator. The shutter B is held in its downward or opened position by means of a catch which engages the shutter when thus opened, and I preferably employ a pin $h$ as this catch, adapted to engage an aperture $h'$ in the shutter-wing and carried by a spring $h^2$, which presses the pin into said aperture when the shutter is opened, and which spring is flexed to move the pin to release the shutter by means of a lever $h^3$, connected by a wire or rod $h^4$ to a lever $h^5$, which carries a trigger or finger-piece $h^6$, that projects to the exterior of the box through a slot in the wall thereof, as shown in Figs. 1 and 3.

A further feature of my invention is the combination, with the camera-box, of the sensitive-plate-holding magazine E. This magazine consists of a box or case having the capacity to hold flatwise, one above another, several sensitive plates $e$, as shown, and adapted to be detachably attached to the plate-opening $a'$ of the camera-box, which is accomplished in this instance by a flange $e'$, holding the lower edge of a shoulder on the front of the magazine, and a button or buttons $e^2$, engaging the upper edge thereof, as shown in Figs. 2 and 3. The magazine is provided with a sliding lid $e^3$, adapted to close over the uppermost of the contained plates. The uppermost plate of the series rests against inwardly-extending projections on the mouth of the magazine, which projections consist, preferably, of an end flange $e^4$, overlapping one of the ends of the plate, and pins $e^5$ in the top and bottom edges of the box, engaging the top and bottom edges of the plate, as shown in Figs. 4 and 5. The magazine is adapted to permit the plates to be released therefrom through its mouth successively individually, and this is conveniently accomplished by means of a recess $e^6$ in the edge of the magazine-frame opposite to the edge thereof having the flange $e^4$, whereby the uppermost plate of the series has play endwise in the mouth of the magazine, while notches $e^7$ in the top and bottom edges of each plate, as shown, permit the plates to pass the pins $e^5$. Thus by pushing the uppermost plate endwise in the mouth of the magazine it will escape the flange $e^4$ and the pins $e^5$ and be free to pass out of the magazine. To accomplish this movement of the plates successively, I preferably provide the push-button $e^8$ on the exterior of the camera-box with a spring-retracted shank or arm $e^9$, seated in a recess in the magazine-frame and reaching through the same and impinging upon the edge of the plate lying under the flange $e^4$, preferably in a notch $e^{10}$, formed in said edge of the plate, as shown in Fig. 5. The plates $e$ are pressed into engagement collectively and successively individually with said projections on the magazine-mouth by a spring or springs interposed between the rear wall or bottom of the magazine and the undermost plate, and I find it preferable to employ four springs $e^{11}$, desirably leaf-springs, arranged to press one upon or about each of the four corners of the plates, as shown, as thereby an equalized pressure is exerted throughout the plates.

$A^5$ is a hinged lid on the box A, adapted to be swung open to permit the magazine E to be attached to the opening $a'$, and then to permit the slide $e^3$ to be withdrawn from the magazine, and then to swing over and inclose the magazine to protect it, as shown in Figs. 2 and 3.

A further feature of my invention consists in the removable negative-receiver F, in the form of a box having a swinging lid and adapted in area and dimensions to receive and contain several negatives made from the plates in the magazine E. This receiver F is placed adjacent to the plate-opening $a'$ in the camera-box, and preferably upon the bottom of the box, immediately in front of and below said opening, and substantially at right angles to said opening, as shown in Figs. 2 and 3. The lid $f$ of said box is hinged to the edge thereof, opposite to the edge adjacent to the opening $a'$, and it has movement concurrent with the movement of the swinging shutter B, so that it opens when the shutter swings in, effecting an exposure, and closes when the shutter swings reversely after such exposure. This may be accomplished by providing the lid-hinge with a spring $f'$, the tendency of which is to throw the lid open, and by providing spring-levers $f^2$ in the camera-box frame, which are actuated by the shutter-shaft $B'$ through wires or rods $f^3$ and $f^4$ and a crank-lever $f^5$, pivoted on the camera-box wall, as shown, and which levers $f^2$ carry pins $f^6$, playing in suitable slots and adapted to press upon and disengage spring-catches $f^7$ from staples $f^8$ in the box-lid $f$. By means of this receiver F, arranged and adapted to operate as described, in conjunction with the described magazine E, when an exposure of the top plate $e$ of the series has been made the lid of the receiver will be open, and by pressure upon the button $e^8$ the said plate will be released from the magazine and will fall face upward in the receiver F. The next plate of the series will thus be ready for exposure in the opening $a'$, and upon the reverse movement of the shutter B the lid of the receiver will close upon the negative therein. This operation is performed successively until all the plates in the magazine are exhausted, when the lid $A^5$ may be opened, the magazine withdrawn, and the receiver containing all the negatives removed from the camera-box, an empty receiver inserted, and a magazine of fresh plates adjusted to the opening $a'$, the camera being thus ready for making another series of exposures. The closing of the lid of the receiver by the reverse movement of the shutter B may be conveniently effected by springs or spring-arms $f^9$, carried by the shutter and adapted to take under lugs $f^{10}$ on the lid, as shown in Figs. 2 and 3.

Another feature of my invention consists in the guards $B^6$ on the upper face of the eye-piece $B^4$ and at either side of the aperture therein and jointed to said eye-piece by the spring-hinges $b^9$, the tendency of which is to throw and hold the said guards erect at the sides of the said aperture when the eye-piece is raised and extended by and upon the lid A³. By this means, when the lid A³ is swung upward, this single movement not only brings the eye-piece and hood into correct position, but the guards B⁶ also assume the desired position without manipulation by the operator.

A further feature of my invention consists in the supplementary frame A⁶, mounted fixedly upon the forward end of the top of the camera-box, and of the same height as the depth of the lid A³, and projecting beyond the front end of the box to the depth of the lid or front-end hinged wall A² thereof. The lid A³ is hinged to said frame A⁶, as shown, and the lid A² closes under said frame and is held by a catch A⁷, located therein. By means of this construction the completed camera-box is rectangular when closed, and the ends of its lids are protected from injury.

G is a "finder" placed in the forward chamber of the camera-box, and an aperture $g$ in the wall of the box registers with said finder. To close said aperture $g$ and at the same time to enable it to be opened expeditiously when the use of the finder is desired, I provide the plug $g'$, attached by its head $g^2$ to the leaf-spring $g^3$, which is fastened to the interior of the box-wall. The spring is so constituted that when the plug is forced inward of the box by pressure upon its outer end said spring will draw or carry said plug to one side of the aperture, thus leaving the aperture unimpeded. Access to the plug to reseat it in its aperture is had by opening the lid A².

The catch I employ to detain the lid A² consists of a lever $h^7$, actuated by a spring $h^8$ and pivoted on a lug $h^9$, carried by the frame A⁶. This lever has a latch $h^{10}$, adapted to engage a notch on the lid A², and the latch is withdrawn by means of an arm $h^{11}$, pivoted to the opposite arm of the lever and reaching through the frame A⁶, where it is provided with a push-button $h^{12}$.

The herein-described plate-holding magazine is capable of use in a camera in which a focusing-glass and mirror are dispensed with, and in which the lens has a permanent or fixed focus. In like manner the negative-receiver described may be used in connection with the plate-magazine in such cameras.

What I claim as my invention, and desire to secure by Letters Patent, is—

1. In a photographic camera, the combination, with the camera-box having a lens-opening and a plate-opening in opposite ends thereof and a focusing-glass in the top, the swinging shutter working between said openings, and the mirror on said shutter to reflect the lens-image on said focusing-glass, of a separate and independent sliding shutter working in ways in the box and having an aperture to register with the lens-opening and adapted to be engaged and moved by said swinging shutter across said lens-opening, substantially as and for the purpose specified.

2. In a photographic camera, the combination, with the camera-box having a lens-opening and a plate-opening in opposite ends thereof and a focusing-glass in the top, the swinging shutter working between said openings, and the mirror on said shutter to reflect the lens-image on said focusing-glass, of a separate and independent sliding shutter working in ways in the box and having an aperture to register with the lens-opening and adapted to be engaged and moved to close the lens-opening by the swinging shutter in its upward movement, together with a catch adapted to hold the sliding shutter closed during the reverse movement of the swinging shutter, and then to release the sliding shutter, so that the same will uncover the lens-opening, substantially as and for the purpose set forth.

3. In a photographic camera, the combination, with the camera-box having a lens-opening and a plate-opening in opposite ends thereof and a focusing-glass in the top, a sliding shutter working in ways in the box and having an aperture to register with the lens-opening and adapted to move across and cover said openings, and a catch adapted to hold said sliding shutter over said lens-opening, of a swinging shutter working between said lens and plate openings and carrying a mirror to reflect the lens-image on the focusing-glass and adapted during its upward movement to engage and move said sliding shutter over said lens-opening and at the conclusion of its reverse movement to trip said catch, so that the sliding shutter is thereby released and will uncover said lens-opening, substantially as and for the purpose set forth.

4. In a photographic camera, the combination, with the camera-box having the described lens and plate openings and focusing-glass and the swinging shutter working between said openings and carrying a mirror to reflect the lens-image on said focusing-glass, of a coil-spring on the shutter-shaft and a spring seated on the box and bearing upon the shutter to swing the shutter to an opened position, said coil-spring being adapted to be auxiliary to said bearing-spring in their joint action, substantially as and for the purpose set forth.

5. In a photographic camera, the combination, with the camera-box having the described lens and plate openings and a focusing-glass and the swinging shutter working between said openings and carrying a mirror to reflect the lens-image on said focusing-glass, of a coil-spring on the shutter-shaft and a leaf-spring connected to said shutter and pivotally attached to a plate pivoted on the box, together with an escapement on said shutter-shaft to adjust the tension of said coil-spring thereon and a set-screw on said plate working in a slot in the box-wall, whereby the tension of the leaf-spring may be adjusted, substantially as and for the purpose set forth.

6. In a photographic camera, the combination, with the camera-box having the described lens-opening and plate-opening and a focusing-glass, the swinging shutter working between said openings and carrying a mirror to reflect the lens-image on said focusing-glass, and the sliding shutter working over said lens-opening and having an aperture to register therewith, of the inclined wall or portion in which is the lens-opening and in which the sliding shutter works and curved flanges or guards on the box-sides on either side of the lens-aperture and adjacent to the swinging shutter, substantially as and for the purpose set forth.

7. In a photographic camera, the combination, with the camera-box having the described lens-opening and plate-opening and focusing-glass and the swinging shutter working between said openings and carrying a mirror to reflect the lens-image on the focusing-glass, of a coil-spring on the shutter-shaft to swing the shutter from between said openings, an escape-wheel $d^6$ on said shaft and pallets $d^7$, pivoted on said box and working to opposite sides of said escape-wheel, and provided with a hand-piece common to both extending to the exterior of the box, substantially as and for the purpose set forth.

8. In a photographic camera, the combination, with the camera-box having the described lens and plate openings and focusing-glass and the swinging shutter working between said openings and carrying a mirror to reflect the lens-image on the focusing-glass, of a spring seated on the box and bearing upon the shutter to force the shutter from between said two openings, substantially as and for the purpose specified.

9. In a photographic camera, the combination, with the camera-box having the described lens and plate openings and focusing-glass and the swinging shutter working between said openings and carrying a mirror to reflect the lens-image upon said focusing-glass, of a leaf-spring attached to said shutter to force it from between said openings and pivotally mounted upon a plate pivoted on said box, together with a set-screw on said plate working in a slot in the box-wall, substantially as and for the purpose set forth.

10. In a photographic camera, the combination, with the camera-box having a lens-opening in one end adapted to be closed by a shutter, an opening in the opposite end adapted to be closed by a plate, an opening in the top closed by a focusing-glass, a mirror arranged to reflect the lens-image upon said glass, and a shutter adapted to swing between said lens and plate openings within and fitting closely to the box, of apertures in the box-wall located therein beyond the limit of movement thereon in both directions of said swinging shutter, whereby the air in the closed box may circulate freely therein during the movement of the swinging shutter in making an exposure, substantially as and for the purpose set forth.

11. In a photographic camera, the combination, with the camera-box having a lens-opening and a plate-opening in opposite ends thereof, a focusing-glass, a mirror arranged to reflect the lens-image upon said glass, and a spring-actuated shutter working between said lens and plate openings, of a sensitive-plate-holding magazine adapted to be detachably attached to said plate-opening in the box, a series of sensitive plates seated flatwise upon each other in said magazine and having notches in their upper and lower edges, a flange on one of the front inner side edges of said magazine, a recess along its opposite side edge, pins fixed in the front, inner, upper, and lower edges thereof, springs to press said plates against said flange and pins, and a spring-retracted arm working in the magazine-frame and adapted to impinge upon the edge of a plate lying directly beneath said flange and in line with said recess, substantially as and for the purpose described.

12. In a photographic camera, the combination, with the camera-box having a lens-opening and a plate opening in opposite ends thereof, a focusing-glass, a mirror arranged to reflect the lens-image upon said glass, and a spring-actuated shutter working between said lens and plate openings, of a sensitive-plate-holding magazine adapted to be detachably attached to said plate-opening in the box and to hold a series of said plates and release said plates therefrom individually in succession, so that they may pass through said plate-opening to the interior of the box, together with a lidded negative-receiver removably seated in the camera-box adjacent to said plate-opening and at right angles to said magazine and adapted to open and receive the plates after exposure as they pass through said opening from said magazine and fall inclinedly within the camera-box, substantially as and for the purpose set forth.

13. In a photographic camera, the combination, with the camera-box having a lens-opening and plate-opening in opposite ends thereof, a focusing-glass, a mirror arranged to reflect the lens-image upon said glass, and a spring-actuated swinging shutter working between said lens and plate openings, of a sensitive-plate-holding magazine adapted to be detachably attached to the plate-opening in the box and to hold a series of said plates and to release said plates therefrom individually in succession, so that they may pass through said opening to the interior of the box, together with a negative-receiver removably seated in the box adjacent to said plate-opening, a spring-hinged lid on said receiver, a catch to hold the lid closed, connection between said catch and the shutter to disengage the former when the latter swings to effect an exposure, so that said lid may open, and spring-arms on the shutter to engage and close the lid when the shutter is swung reversely, substantially as and for the purpose set forth.

14. In a photographic camera, the combination, with the camera-box having a lens-opening and a plate-opening in opposite ends thereof, a focusing-glass, a mirror arranged to reflect the lens-image upon said glass, and a spring-actuated shutter working between said lens and plate openings, of a sensitive-plate-holding magazine adapted to be detachably attached to the plate-opening in the box and to hold a series of said plates and release them therefrom individually in succession and permit them to pass through said plate-opening to the interior of the box, together with a lid hinged upon the end of the camera-box and adapted to close over said magazine when attached to said plate-opening, substantially as and for the purpose set forth.

15. In a photographic camera, the combination, with the camera-box having a lens-opening and a plate-opening in opposite ends thereof, a focusing-glass, a mirror arranged to reflect the lens-image on said glass, a swinging shutter working between said lens and plate openings, and a separate and independent sliding shutter working in ways in the box and having an aperture to register with said lens-opening and adapted to be engaged and moved by the swinging shutter in effecting an exposure, of a motion-limiting stop-pin $b^3$, arranged to project into the box and engage said swinging shutter when it has passed said lens-opening and before it engages said sliding shutter, carried by an arm $b^4$, working in a recess in the box-wall, a lever $b^5$, linked to said arm and extending through a slot in said wall to the outside of the box, a fulcrum-pin $b^6$ on said lever, working to the inner edges of said slot, and a retracting-spring $b^7$, engaging said arm, substantially as and for the purpose set forth.

16. In a photographic camera, the combination, with the camera-box A, having a lens-opening and a plate-opening in opposite ends thereof, and a focusing-glass, and containing the operative shutters and mirror, and provided with a chamber on its forward end inclosing the lens-holder, having a hinged lid $A^2$ to close the front of the same, a plate-holding magazine in the plate-opening and a hinged lid $A^5$ to close over the same, and an eye-piece $B^4$ above the focusing-glass, a collapsible hood $B^5$, connecting the eye-piece to the box at said glass, and a lid $A^3$, to which said eye-piece is hinged and adapted to close over said glass, hood, and eye-piece, and also the upper edge of lid $A^5$, of a frame $A^6$, fixed on the top of the forward end of the box, extending laterally thereof, and of a height equal to that of the lid $A^3$ when closed, and projecting over and covering the upper edge of lid $A^2$, a catch $A^7$ in said frame to detain said lid $A^2$ when closed, and a hinge on said frame for said lid $A^3$, whereby when said lids are all closed the camera-case is rectangular in outline and plane-faced on all sides exteriorly, substantially as and for the purpose set forth.

17. In a camera of the class described, the combination, with the lid $A^2$, adapted to close under the projecting frame $A^6$ on the top of the forward end of the camera-box, of a catch seated in said frame and consisting of a lever $h^7$, carrying on one arm a catch $h^{10}$, a spring $h^8$, to press said lever to engage said catch in a notch in said lid, a button $h^{12}$ at the exterior of said frame, and a shank $h^{11}$ thereon reaching to the opposite arm of said lever to swing the lever against the stress of said spring and lift said catch out of said notch on the lid, substantially as and for the purpose set forth.

18. In a photographic camera of the class described, the combination, with the camera-box having the chamber specified on its forward end inclosing the lens-holder and provided with a hinged lid $A^2$, of a finder G, seated in said chamber, an aperture $g$, registering with the lens of said finder, a plug $g'$ to close said aperture, and a spring $g^3$, carrying said plug and attached to the inner side of said lid adjacent to said aperture $g$ therein, substantially as and for the purpose set forth.

19. In a photographic camera of the class described, having the focusing-glass $B^3$ in its top, the hood $B^5$, eye-piece $B^4$, and lid $A^3$, to which said eye-piece is hinged, and which is adapted to close over said glass, hood, and eye-piece, the combination, with said eye-piece, of the side guards $B^6$, spring-hinged to the upper side thereof on each side of the sight-aperture therein, and thus adapted, when said lid is raised and the eye-piece takes position over said glass, to assume an erect position thereon without manipulation by the operator, substantially as and for the purpose set forth.

CALVIN RAE SMITH.

Witnesses:
ARDEN S. FITCH,
A. T. FALES.